United States Patent [19]

Jacobson et al.

[11] Patent Number: 4,828,346

[45] Date of Patent: May 9, 1989

[54] TRANSPARENT ARTICLE HAVING HIGH VISIBLE TRANSMITTANCE

[75] Inventors: Donald V. Jacobson, Concord; Roy L. Bernardi, Vacaville; Francis W. Ryan, Martinez, all of Calif.

[73] Assignee: The BOC Group, Inc., Murray Hill, N.J.

[21] Appl. No.: 785,626

[22] Filed: Oct. 8, 1985

[51] Int. Cl.$^4$ .......................... G02B 5/28; G02B 1/10; B05D 5/06; B60L 1/02

[52] U.S. Cl. ..................... 350/1.7; 219/203; 350/164; 427/163

[58] Field of Search ................ 350/1.7, 164; 219/203; 427/163

[56] References Cited

U.S. PATENT DOCUMENTS

| | | | |
|---|---|---|---|
| 3,849,244 | 11/1974 | Groth | 350/164 X |
| 3,945,903 | 3/1976 | Svendor et al. | 204/192 |
| 4,189,205 | 2/1980 | Vandehei | 350/164 X |
| 4,337,990 | 7/1982 | Fan et al. | 350/1.7 |
| 4,368,945 | 1/1983 | Fujimori et al. | 350/1.7 |
| 4,462,883 | 7/1984 | Hart | 204/192 C |
| 4,497,700 | 2/1985 | Groth et al. | 204/192 |

FOREIGN PATENT DOCUMENTS

| | | | |
|---|---|---|---|
| 0031278 | 7/1981 | European Pat. Off. | 350/1.7 |
| 1307642 | 2/1973 | United Kingdom . | |
| 2121075 | 12/1983 | United Kingdom | 350/1.7 |

Primary Examiner—John K. Corbin
Assistant Examiner—David J. Edmondson
Attorney, Agent, or Firm—David A. Draegert; Larry R. Cassett

[57] ABSTRACT

A transparent article comprising a base, at least four coated layers, and a top protective layer is disclosed. The coated layers include a first dereflecting region, a transparent layer of silver or other metal, and a second dereflecting region comprising a layer of titanium dioxide and a layer of another dielectric mater. A titanium dioxide layer may also be a component of the first dereflecting region. Each dereflecting region that includes a titanium dioxide layer also comprises a layer of a transparent oxide or other dielectric material having an index of refraction intermediate between about 2.7, the approximate index of titanium dioxide, and the index of the nearby base or top layer, respectively. The intermediate index material is preferably zinc oxide because this material can be relatively quickly and inexpensively deposited by reaction sputtering. Also disclosed is a method for depositing the coated layers by sputtering and reactive sputtering of titanium and silver, zinc or other materials. The coating is useful as a component of a laminated window, particularly on electrically heated windshields for automobiles.

22 Claims, 2 Drawing Sheets

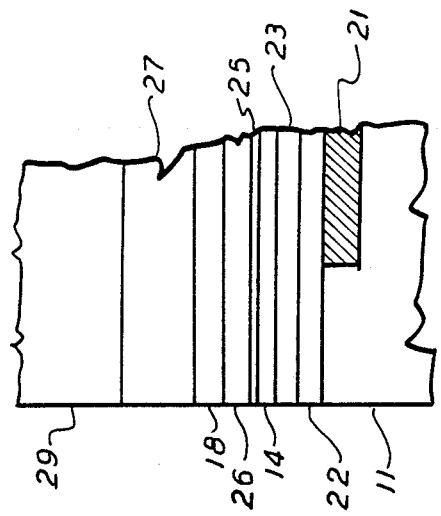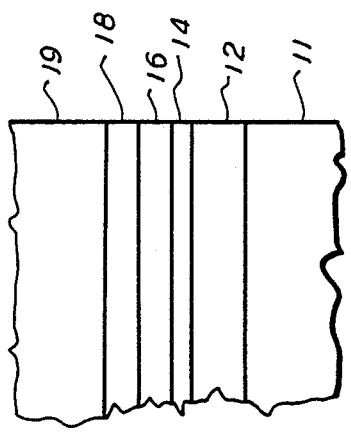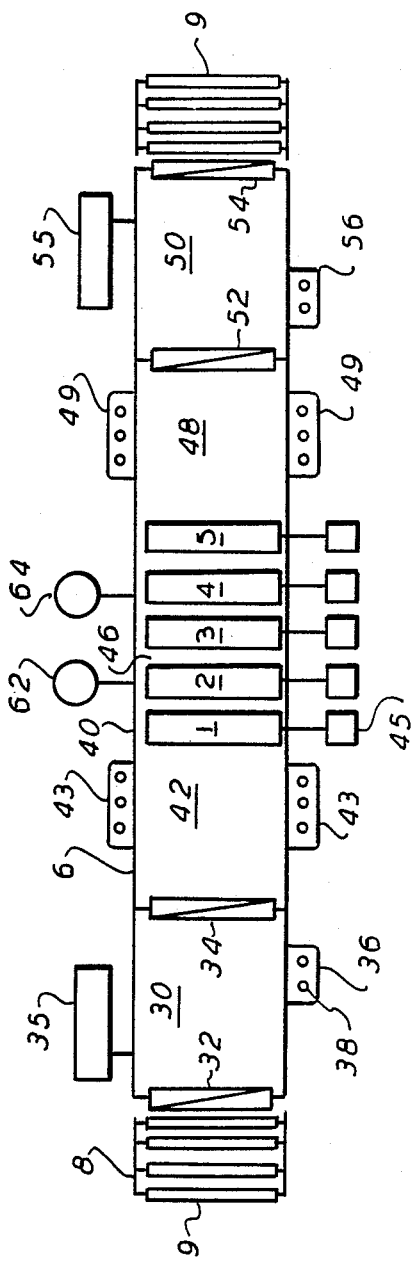

TRANSPARENT ARTICLE HAVING HIGH VISIBLE TRANSMITTANCE

BACKGROUND OF THE INVENTION

1. Field of the Invention

The invention relates to a transparent article suitable for use as a window and particularly to an electrically conductive coating for windows of motor vehicles where it is necessary to remove ice or fog.

2. Background Information

Partially transparent coatings comprising a thin metal layer between two dielectric anti-reflection layers have many applications, including solar heat rejecting windows for buildings and vehicles. Electrically conductive coatings capable of heating the window to remove ice or fog are particularly desirable. Coatings having uniform, high conductivity and uniform transmittance of greater than 70% are needed for heated windshield applications.

U.K. Patent No. 1 307 642 to Asahi Glass Co. discloses an electrically heated window having a dielectric-metal-dielectric coating wherein the metal layer is silver and the dielectric layers are $TiO_2$, $SnO_2$, or $Bi_2O_3$ among others.

U.S. Pat. No. 4,368,945 to Fujimori et al discloses an infrared reflecting laminated window comprising a plastic film on which is desposited a dielectric-metal-dielectric coating of tungsten oxide, silver and tungsten oxide.

U.S. Pat. No. 4,462,883 to Hart discloses a dielectric-metal-dielectric coating for glass or plastic windows comprising a layer of silver between two anti-reflection layers of $SnO_2$ or other metal oxide. In order not to oxidize the silver layer, it is coated with a small amount of titanium or other sacrificial metal which is oxidized during reactive sputtering of the overlaying metal oxide layer. The resulting coated article has a low emissivity i.e., it transmits visible radiation but reflects a high proportion of the incident infrared radiation. A particular method for depositing coatings comprising layers of silver and a sacrificial metal oxide are described in U.S. Pat. No. 4,497,700 to Groth et al.

U.S. Pat. No. 4,337,990 to Fan et al. discloses a transparent heat mirror comprising a layer of sputtered silver sandwiched between layers of reactively sputtered titanium dioxide.

Laminated glass containing a dielectric-metal-dielectric coating of $TiO_2$-$Ag$-$TiO_2$ has high visible transmittance, high infrared reflection and other superior optical properties. Unfortunately, titanium dioxide forms at a relatively slow rate by reactive sputtering; the rate is only about 8% of that for zinc oxide or tin oxide. However, when glass having a coating of ZnO-Ag-ZnO was laminated with a layer of plastic and glass by conventional techniques, the transmittance decreased by a surprisingly large amount. The resulting transmittance is only slightly greater than required for windshield applications and unusual care is required to produce it in commercial quantitites.

The present invention is directed to a dielectric-metal-dielectric coating having optical properties suitable for heated windshields and other applications and to a method for producing it in commercial quantities at a reasonable cost.

SUMMARY OF THE INVENTION

The invention is directed to a transparent article comprising a base, at least four coated layers, and a top protective layer. The coated layers include a first dereflecting region, a transparent layer of silver or other metal, and a second dereflecting region comprising a layer of titanium dioxide, $TiO_2$, and a layer of another dielectric material. A titanium dioxide layer may also be a component of the first dereflecting regions. Each deflecting region that includes a titanium dioxide layer also comprises a layer of a transparent oxide or other dielectric material having an index of refraction intermediate between about 2.7, the approximate index of titanium dioxide, and the index of the nearby base or top layer, respectively. The intermediate index material is preferably zinc oxide because this material can be relatively quickly and inexpensively deposited by reactive sputtering. Bismuth oxide, indium oxide, tin oxide, silicon monoxide and other materials may be used for the intermediate index layers. If desired, a mixed oxide such as indium-tin oxide, or a composite of two or more layers may be used. Preferably, the metal layer has a resistivity of less than 5 ohms square. The preferred metal is silver, because of its neutral color and high electrical conductivity, but copper, gold or aluminum may be used in less critical applications.

BRIEF DESCRIPTION OF THE DRAWINGS

FIG. 1 is a cross-sectional view of a transparent article according to the present invention.

FIG. 2 is a cross-sectional view of another embodiment of the invention.

FIG. 4 is a plan view of an apparatus for making transparent articles according to the invention.

DESCRIPTION OF THE PREFERRED EMBODIMENTS

Figure 3A:
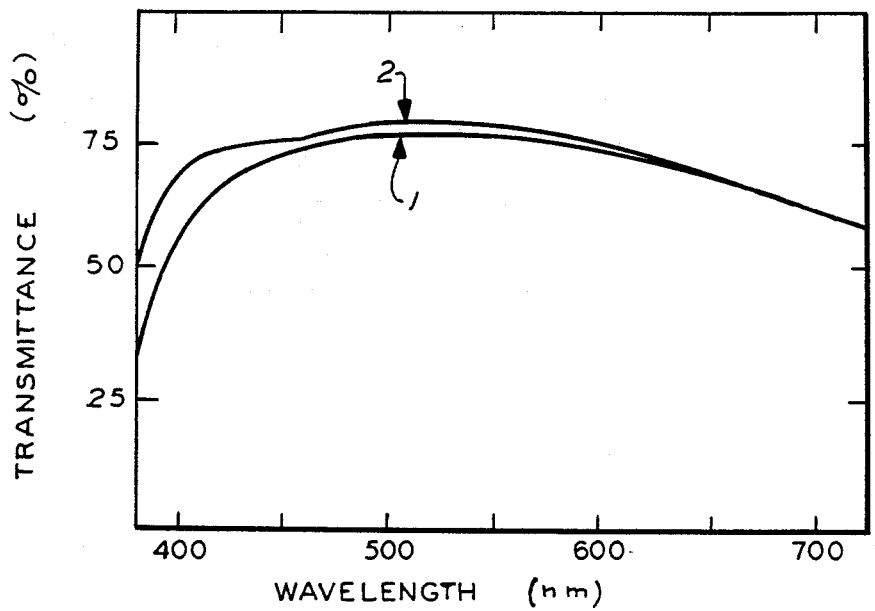
FIGS. 3a and 3b are graphs illustrating the spectral transmittance and reflectance of a comparison coating (curves 1) and of a preferred embodiment (curves 2).

One preferred embodiment of the invention is illustrated in FIG. 1. The transparent substrate or base material 11 is typically glass or plastic having a refractive index of about 1.5. 2.5 mm thick, soda-lime-silica float glass may be used. The base is coated with a first transparent, dereflecting layer 12, preferably deposited by reactive sputtering of a metal. The layer may comprise 30 to 60 nm of zinc oxide having an index of approximately 2.0. Next, is a metallic layer 14 having a thickness of 10 to 50 nm; silver having a thickness of 15 to 20 nm is particularly preferred. Next is a layer of titanium oxide 16, having a thickness of 2 to 5 nm and preferably formed by oxidizing a metallic titanium layer and then depositing additional titanium dioxide by reactive sputtering. Layer 16 is followed by a layer 18 having an index of refraction intermediate between that of a top layer 19 and 2.7 which is the refractive index of titanium dioxide. This layer 18 may be zinc oxide of the same or less thickness as the layer 12. The top layer 19 is a layer of transparent glass or plastic, typically having an index of about 1.5.

FIG. 2 illustrates an alternative embodiment specifically designed as an electrically heated window. The substrate 11 is a sheet of glass that is partially covered by a pattern of electrically conductive material 21 which serves as an electrode to enable current to be transmitted to a metallic layer 14. The first dereflecting region comprises a layer of zinc oxide 22 and may also comprise a layer 23 of titanium dioxide. If included, the titanium dioxide layer 23 is adjacent a metallic layer 14 of silver. The silver layer is covered with a thin layer 25 of sacrificial metal which serves to protect the underlying silver layer from oxidation. Because of its great affinity for oxygen, titanium is preferred, but aluminum, zinc, bismuth, indium, tin and other metals are also suitable. Most of the sacrificial metal is converted to an oxide which forms a part of a second dereflecting region. This dereflecting region also includes a layer 26 of titanium dioxide and a second intermediate index layer 18, preferably of zinc oxide. The top layer comprises a sheet of plastic 27 and a sheet of glass 29.

The preferred embodiment has an electrical resistivity of 4 to 5 ohms/square. The optical transmittance is greater than 70% and preferably greater than 72% with low absorption. Refractive indices in the range 2.5 to 2.7 have been measured for the titanium dioxide layer.

The composition of a particularly preferred embodiment is shown in Table 1. The glass layers 11 and 19 are each 2.5 mm thick, but this thickness is not critical.

TABLE 1

| LAYER | 11 | 12 | 14 | 16 | 18 | 19 |
|---|---|---|---|---|---|---|
| MATERIAL | Glass | ZnO | Ag | TiO$_2$ | ZnO | Glass |
| THICKNESS (nm) | | 37 | 18 | 3 | 35 | |
| INDEX OF REFRACTION | 1.5 | 2.0 | | 2.6 | 2.0 | 1.5 |

Figure 3B:
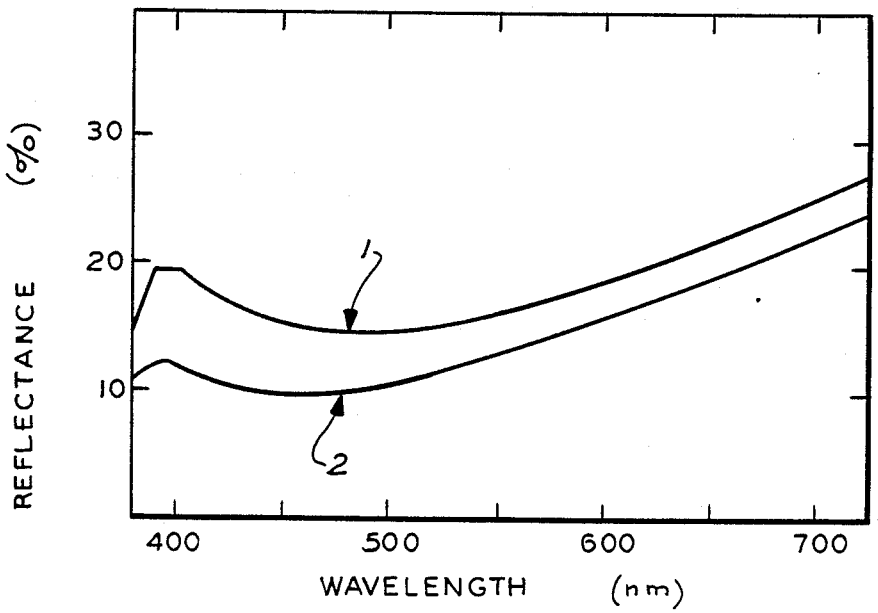

Curves 1 in FIGS. 3a and 3b show the spectral transmittance and reflectance of Example 1, a three layer coating of 40 nm zinc oxide, 18 nm silver, and 40 nm zinc oxide on a glass substrate and covered with a top layer of glass. Curves 2 show the spectral properties of Example 2, the embodiment of the invention described in Table 1. It is significant that the embodiment of the invention has high transmittance in the visible spectral region and a high reflectance in the near infra-red.

Spectrally averaged (Illuminate A) optical properties are summarized in Table 2. $T_1$ and $R_1$ refer to the transmittance and reflectance of the coated base before the top layer is applied. $T_2$, $R_2$ and $R_3$ correspond to the transmittance and reflectance of the laminated article including top layer 19. $R_2$ and $R_3$ refer to the reflectance for light incidence on base 11 and top layer 19, respectively. The final column gives the emissivity e of the article. Low emissivity is a measure of high infrared reflectivity and emissivities of 0.15 or less are preferred for solar heat rejecting windows; values of 0.1 or less are especially preferred.

For comparison, the first two rows of Table 2 give the optical properties of Examples 1 and 2. Note that the invention, Example 2, provides higher visible transmittance $T_2$, lower reflectances $R_2$ and $R_3$, and substantially the same emissivity e.

The third row of Table 2 shows the corresponding optical properties of a coating of 33 nm zinc oxide, 3.5 nm titanium dioxide, 18 nm silver, 3 nm titanium dioxide and 33 nm zinc oxide.

For further comparison, the fourth row of Table 2 shows corresponding optical properties for a coating of 30 nm titanium dioxide, 18 nm silver and 30 nm titanium dioxide.

TABLE 2

| EXAMPLE | $T_1$ | $R_1$ | $T_2$ | $R_2$ | $R_3$ | e |
|---|---|---|---|---|---|---|
| 1 | 84 | 7 | 72 | 17 | 17 | 0.06 |
| 2 | 85 | 6 | 74 | 15 | 15 | 0.06 |
| 3 | 85 | 5 | 75 | 14 | 14 | 0.06 |
| 4 | 85 | 6 | 81 | 10 | 9 | 0.06 |

As indicated in Table 2, all four Examples have closely similar values of visible transmittance $T_1$, and emissivity e, but the two embodiments of the invention, Examples 2 and 3, have transmittances $T_2$ and reflectances $R_2$ and $R_3$ intermediate between Examples 1 and 4 for which the dereflecting layers are exclusively ZnO or TiO$_2$, respectively. Since an automobile windshield is currently required to have a transmittance $T_2$ of at least 70%, the increase in $T_2$ from 72% (Example 1) to 74% (Example 2) is commercially significant because it provides a margin for reasonable tolerances at all steps of the manufacturing process.

Certain characteristics of materials which are suitable for sputtering in accordance with the present convention are shown in Table 3. These properties include the melting point (M.P.), approximate cost and index refraction of the indicated oxides. Generally, higher melting point materials enable higher deposition rates because more power can be supplied to the sputtering source without softening or deforming the sputtering target.

TABLE 3

| MATERIAL | M.P. (°C.) | COST ($/LB) | OXIDE | REFRACTIVE INDEX |
|---|---|---|---|---|
| Ti | 1660 | 25 | TiO$_2$ | 2.7 |
| Zn | 419 | 0.4 | ZnO | 2.1 |
| Sn | 232 | 0.7 | SnO$_2$ | 2.0 |
| In | 157 | 50 | In$_2$O$_3$ | |
| Bi | 271 | 8 | Bi$_2$O$_3$ | |
| Si | 1410 | 0.6 | SiO | 2.0 |

FIG. 4 shows a plan view of an apparatus suitable for depositing the coated layers. The coating machine comprises sputtering sources 1–5, preferably of the planar magnetron type, an evacuable chamber 6 for providing a suitable low pressure sputtering environment, and a conveyor 8 for transporting substrates through the machine past the sputtering sources. Preferably, the conveyor is a series of motor driven rollers 9 which extends from the entrance through all of the chambers to the exit of the machine. The rollers inside the machine are omitted from FIG. 4. A side view of a somewhat similar machine is shown in FIG. 1 of U.S. Pat. No. 3,945,903 to Svendor et al.

The substrates to be coated are placed on the conveyor 8 and moved to the external gate 32 of an entrance lock 30. The entrance lock enables the low pressure environment of the processing chamber 40 to be maintained by having the interior gate closed 34 while the exterior gate 32 is opened to transport substrates into the lock 30. When the desired number of substrates are positioned in the lock, the external gate is closed and the chamber 30 rapidly evacuated. The lock is pumped to about 60 mT by a Roots type mechanical pump 35 backed by three mechanical pumps operating in parallel. The pressure is lowered further by switching to pumping through a plenum 36 fitted with two diffusion pumps and two air-activated poppet valves 38. The plenum is also fitted with mechanically refrigerated cold traps for removing water vapor. After the entry lock is evacuated to a pressure of approximately 0.1 mT, the interior gate 34 is opened and the substrates moved from the entry lock 30 into an entry buffer section 42. Buffer section 42 has two plenums 43 each containing three diffusion pumps and associated poppet valves.

The five sputtering sources 1-5 are preferably planar magnetron sources of the type described in U.S. Pat. No. 4,166,018 of John S. Chapin, assigned to the assignee of the present application. The sputtering zone is evacuated via the plenums 43 and 49 connected to the two buffer sections. One sputtering gas, usually argon, is provided from a supply 62 connected to the process chamber via a first valve. A reactive sputtering gas, usually oxygen, enters the processing chamber via a second valve from a second supply 64.

When all is ready, the substrates are transported from the entry buffer past the series of sputtering sources, one or more of which are activated by individual power sources 45. The substrates are transported to the exit buffer section 48 which is fitted with two pumping plenums 49 similar to those of the entry buffer section. The sputter gas is changed and the substrates are passed back and forth through the sputtering zone 46 as necessary to deposit the required layers in the order desired. When the coating is completed, a second interior gate 52 is opened and the substrates transported into an exit lock 50. After the interior gate is closed and the lock 50 is vented to the atmosphere, the substrates are removed via a second external gate 54. The empty exit lock is then evacuated by pumps 55, 56 similar to those of the entry lock 30.

The gas supply valves, the sputtering power supplies, the gate valves, the conveyor and other operable elements of the coating apparatus may be automatically or manually controlled by conventional means, as desired. Further, means can be provided for washing, rinsing, drying and inspecting the substrates before they are coated.

A process for producing a particular coating will now be described. Targets of the appropriate materials must first be installed on the sputtering sources in the processing chamber. For example, titanium and silver cathodes may be installed in positions 1 and 3, respectively, and zinc targets may be installed in positions 2, 4 and 5. High purity target materials (99.95% Ag, 99.95% Zn and 99.8% Ti) are preferred for best results in heated windshield applications but lower purity materials may be suitable in some applications. Glass windshields or other suitable substrates are cleaned, loaded onto the conveyor and transported into the processing apparatus. In a first pass, moving to the right in FIG. 4, a layer of zinc oxide is deposited by applying power to only the three zinc sputtering sources and introducing a mixture of 95% oxygen and 5% argon into the chamber to maintain a pressure of approximately 2 mT. The sputtering power and transport speed are adjusted to produce the desired thickness. For example, a power of 79 kW applied to each of the three sputtering sources can produce a zinc oxide layer of approximately 37 nm thickness on substrates moving at the rate of 0.16 m/sec.

Thin layers of silver followed by titanium are deposited on the zinc oxide layer by changing to a non-reactive sputtering gas and transporting the substrates in the reverse direction, back towards the left in FIG. 4. With an argon atmosphere of 3 mT, a power of 17 kW applied to the silver sputtering source in position 3 and a power of 14 kW applied to the titanium sputtering source in position 1, thicknesses of 18 nm Ag and 2 nm Ti are to deposited with a conveyor speed of 0.25 m/sec. If necessary to eliminate oxygen, the titanium source can be operated for a time just before the substrates are conveyed through the sputtering zone.

The titanium layer is oxidized and this material coated with additional titanium dioxide and then zinc oxide on a third pass, moving towards the right in FIG. 4. Typically, an atmosphere of 95% oxygen and 5% argon at a pressure of about 2 mT is maintained, and a power of 90 kW is applied to the titanium cathode in position 1 and a power of 79 kw is applied to each of the three zinc sources. This is sufficient to deposit a 1 nm layer of titanium dioxide and a 35 nm layer of zinc oxide on substrates travelling at the rate of 0.14 m/sec. When the sacrificial metal covering the silver layer is titanium, it is readily incorporated into the titanium dioxide layer. Exact stoichometry is not critical.

The coated glass may then be assembled into a laminated windshield by covering the coating with a layer of plastic and then a layer of glass by conventional techniques. Normally, the windshield is installed with the top layer towards the interior of the vehicle. Alternatively, other deposited layers may be applied to the coated base. These additional layers could be a transparent hard material which will provide a scratch-resistant, protective coating. Such additional layers could be deposited by additional sputtering steps in the processing chamber or by other means.

What is claimed is:

1. An electrically conductive transparent article, comprising in order:
   a transparent base;
   a first transparent dereflecting layer;
   a transparent metallic layer;
   a titanium dioxide layer having a thickness of 2 to 5 nanometers;
   a second dereflecting layer having an index of refraction intermediate between a top layer and 2.7;
   a top protective layer and
   an electrode for transmitting electric current to the metallic layer.

2. The transparent article of claim 1 wherein the metallic layer is selected from the group consisting of silver, copper, aluminum and gold.

3. The transparent article of claim 2 wherein the material of the first dereflecting layer and the material of the second dereflecting layer are selected from the group consisting of zinc oxide, bismuth oxide, indium oxide, silicon monoxide, tin oxide, and mixed indium-tin oxide.

4. The article of claim 3 wherein the metallic layer is silver having a thickness in the range of 15 to 20 nm.

5. The transparent article of claim 4 further comprising a sacrificial metal oxide layer adjacent the silver layer and the sacrificial metal is selected from the group consisting of titanium, aluminum, zinc, bismuth, indium and tin.

6. The transparent article of claim 5 wherein the two dereflecting layers are zinc oxide having a thickness in the range 30 to 60 nm.

7. The transparent article of claim 6 wherein the sacrificial metal is titanium.

8. The transparent article of claim 7 wherein the base and the top layer comprise glass.

9. The transparent article of claim 8 wherein the top layer comprises a layer of plastic between the glass layer and the second dereflecting layer.

10. The transparent article of claim 9 wherein the resistivity of the coated layers is less than 5 ohms/square.

11. The transparent article according to claim 10 wherein the transmittance for visible radiation is at least about 72%.

12. The transparent articles of claim 11 wherein the emissivity of the article is less than about 0.1.

13. The article of claim 10 wherein the metallic layer is deposited by sputtering and the two dereflective layers are deposited by reactive sputtering.

14. The transparent article according to claim 8, further comprising a titanium dioxide layer having a thickness of 2 to 5 nanometers between the first transparent dereflecting layer of zinc oxide and the silver layer.

15. The transparent article according to claim 1 further comprising a titanium dioxide layer having a thickness of 2 to 5 nanometers between the first transparent dereflecting layer and the transparent metallic layer.

16. A process for making an electrically conductive transparent article having a visible transmittance of greater than 70% and a resistivity of less than 5 ohms/-square, comprising:
 depositing a first dereflecting layer on a transparent base by reactive sputtering of a metal;
 depositing a transparent metal layer by sputtering a metal selected from the group consisting of silver, copper, aluminum and gold;
 depositing a layer of titanium dioxide having a thickness of 2 to 5 nanometers adjacent the metal layer by sputtering;
 covering the sputtered layers with a top protective layer; and
 providing an electrode for transmitting electric current to the metallic layer.

17. The process according to claim 16 wherein the reactively sputtered metals are selected from the group consisting of zinc, bismuth, indium and tin.

18. The process of claim 17 wherein the metal layer is silver and further comprising the step of depositing on the silver layer a sacrificial metal layer by sputtering a metal selected from the group consisting of titanium, aluminum, zinc, bismuth, indium, and tin.

19. The process according to claim 16 wherein:
 the first dereflecting layer is deposited on a first pass through a sputter coating system;
 the silver and the sacrificial metal layers are deposited on a second pass through a sputter coating system; and
 the second dereflecting layer is deposited on a third pass through the sputter coating system.

20. The process according to claim 19 wherein the sacrificial metal is titanium.

21. The process according to claim 20 wherein the first dereflecting layer is zinc oxide and the second dereflecting layer is zinc oxide.

22. The process according to claim 17, further comprising depositing a second layer of titanium dioxide having a thickness of 2 to 5 nanometers adjacent the metal layer by sputtering.

* * * * *

UNITED STATES PATENT AND TRADEMARK OFFICE
CERTIFICATE OF CORRECTION

PATENT NO. : 4,828,346
DATED : May 9, 1989
INVENTOR(S) : Donald V. Jacobson, Roy L. Bernardi, Francis W. Ryan It is certified that error appears in the above-identified patent and that said Letters Patent is hereby corrected as shown below:

On the title page:

In the Abstract, line 6 "mater" should read "matter".

In the Abstract, line 16, "reaction" should read "reactive".

At column 2, line 47, "metallic" should read "metallic".

At Claim 16, after line 16 (col 7, after line 30) insert -- depositing a second dereflecting layer by reactive sputtering of a metal; --

Signed and Sealed this

Fifth Day of June, 1990

Attest:

HARRY F. MANBECK, JR.

*Attesting Officer*　　　　*Commissioner of Patents and Trademarks*